(12) United States Patent  
Liu et al.

(10) Patent No.: US 7,845,732 B2
(45) Date of Patent: Dec. 7, 2010

(54) VEHICLE ARMREST POSITIONING ASSEMBLY

(75) Inventors: Hsing Lung Lewis Liu, Wixom, MI (US); Karl A. Murphy, Novi, MI (US)

(73) Assignee: Porter Group, LLC, Novi, MI (US)

( * ) Notice: Subject to any disclaimer, the term of this patent is extended or adjusted under 35 U.S.C. 154(b) by 274 days.

(21) Appl. No.: 12/112,327

(22) Filed: Apr. 30, 2008

(65) Prior Publication Data

US 2008/0296954 A1 Dec. 4, 2008

Related U.S. Application Data

(60) Provisional application No. 60/932,458, filed on May 31, 2007.

(51) Int. Cl.
*B60N 2/46* (2006.01)
(52) U.S. Cl. .............................. 297/411.38; 297/411.32
(58) Field of Classification Search ................ 297/375, 297/408, 411.38, 411.32, 411.34
See application file for complete search history.

(56) References Cited

U.S. PATENT DOCUMENTS

| | | | |
|---|---|---|---|
| 3,874,480 A | 4/1975 | Porter et al. | |
| 5,076,645 A | 12/1991 | Yokota | |
| 5,157,826 A | 10/1992 | Porter et al. | |
| 5,984,416 A | 11/1999 | Waldo et al. | |
| 6,209,960 B1 | 4/2001 | Bradbury | |
| 2003/0075394 A1 | 4/2003 | Shields et al. | |

FOREIGN PATENT DOCUMENTS

| | | | |
|---|---|---|---|
| JP | 52-35026 | | 3/1977 |
| JP | 0898741 A | * | 4/1996 |
| JP | 9-39629 A | | 2/1997 |

* cited by examiner

*Primary Examiner*—Joseph Edell
(74) *Attorney, Agent, or Firm*—Brooks Kushman P.C.

(57) ABSTRACT

A vehicle armrest positioning assembly (12) for adjustably positioning a vehicle armrest (10) on a vehicle seat frame (14) includes an elongated adjuster (20) that provides armrest positioning and is released by a release actuator (44) a release mechanism (42) to permit angular adjustment of the armrest positioning. The adjuster (20) includes a housing (22) that positions an adjusting rod (24) by a helical lock spring (32) to control the armrest positioning and adjustment.

10 Claims, 3 Drawing Sheets

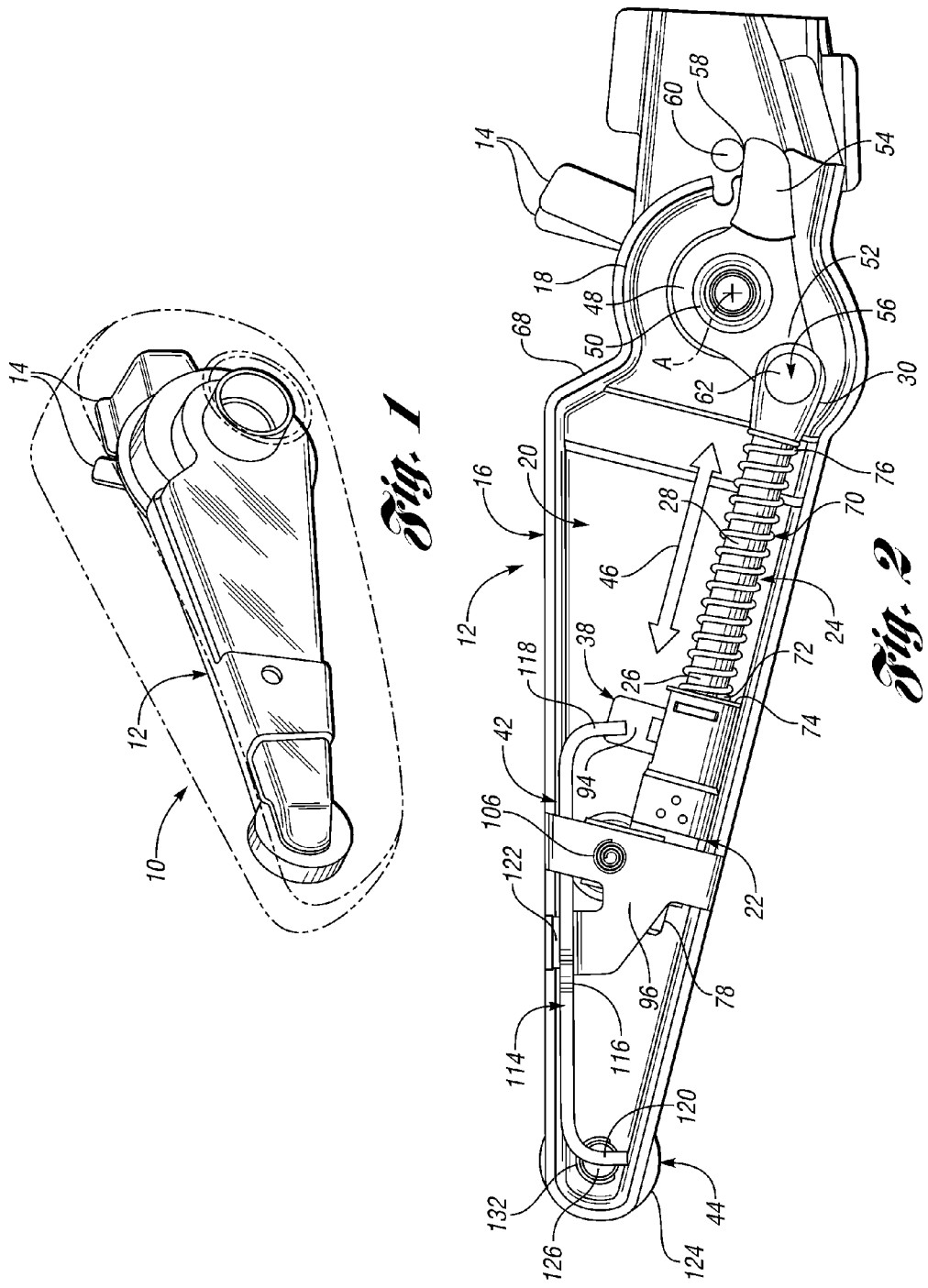

VEHICLE ARMREST POSITIONING ASSEMBLY

CROSS-REFERENCE TO RELATED APPLICATIONS

This application claims the benefit of U.S. provisional application Ser. No. 60/932,458 filed by Hsing Lung Lewis Liu and Karl A. Murphy on May 31, 2007 under the title VEHICLE SEAT ARMREST HAVING TILT ADJUSTER.

BACKGROUND OF THE INVENTION

1. Field of the Invention

This invention relates to a vehicle armrest positioning assembly for supporting an armrest on a vehicle seat frame.

2. Background Art

Many vehicle seats include one or two armrests for providing seating comfort. These armrests have previously been pivoted between a generally forward and horizontal use position and a generally vertical but slightly rearwardly inclined nonuse position.

SUMMARY OF THE INVENTION

An object of the present invention is to provide an improved vehicle armrest positioning assembly for supporting an armrest on a vehicle seat frame.

In carrying out the above object, the vehicle armrest positioning assembly of the invention includes a pivotal support arm for mounting within an armrest and having a support end for pivotally supporting the armrest about a pivotal axis on the vehicle seat frame to position the armrest with respect to the seat frame. An elongated adjuster of the positioning assembly includes a housing mounted by the support arm, an elongated adjusting rod having one end supported by the housing and having an intermediate portion extending from the housing as well as having a distal end. The distal end of the adjusting rod cooperates with the seat frame to control the pivotal positioning of the armrest on the seat frame. A helical lock spring mounted within the housing receives the one end of the adjusting rod and the helical lock spring has a first end that is fixed to the housing and a second end that is movable with respect to the housing about the one end of the adjusting rod. The helical lock spring clamps about the one end of the adjusting rod to position the adjusting rod against movement inwardly or outwardly of the housing. A release member of the adjuster is mounted by the housing for rotation about the one end of the adjusting rod and has a connection to the second end of the helical lock spring. A release mechanism of the positioning assembly is mounted on the support arm and has a release actuator for rotating the release member of the adjuster to move the second end of the lock spring and increase the diameter thereof so the adjusting rod can move inwardly or outwardly of the housing and thereby adjust the position of the armrest.

As disclosed, the vehicle armrest positioning assembly includes a control member pivotally supported on the support end of the support arm and having a connection portion and a stop portion. A pivotal connection connects the connection portion of the control portion to the distal end of the adjusting rod, and the stop portion has a stop surface for contacting a stop on the seat frame to position the armrest in a position whose angle is controlled by the extent to which the adjusting rod extends from the housing of the adjuster. The pivotal connection includes a pivot pin, and the distal end of the adjuster rod and the connection portion of the control member have pivot openings that receive the pivot pin to pivotally connect the adjuster rod and the control member. Also, the support arm includes a stop surface for contacting the stop on the seat frame to position the armrest in a rearwardly inclined nonuse position.

The vehicle armrest positioning assembly is disclosed as having the adjuster including a biasing spring that biases the adjusting rod outwardly with respect to the housing. The biasing spring as disclosed is a helical spring through which the adjusting rod extends, and the biasing spring has one end that contacts the adjuster housing and another end that contacts the adjusting rod adjacent its distal end to provide the biasing of the adjusting rod outwardly with respect to the housing. The adjuster housing as disclosed includes a bushing mounted on the support arm and having an opening through which the adjuster rod extends and is slidable. A sleeve is mounted by the bushing and receives the helical lock spring through which the adjuster rod extends. The first end of the helical lock spring is connected to the adjuster housing at the bushing, and the sleeve also receives the release member to which the second end of the helical lock spring is connected. Also, a bracket that mounts the bushing of the adjuster housing on the support arm.

The release mechanism as disclosed includes a first class release lever having an intermediate portion pivotally mounted on the support arm, a first end that contacts the release member of the adjuster, and a second end that is moved by the release actuator to thereby rotate the release member of the adjuster to move the second end of the lock spring and increase the diameter thereof so the adjusting rod can move inwardly or outwardly of the housing and adjust the position of the armrest. The first and second ends of the release lever have bent shapes that respectively contact the release lever of the adjuster and the release actuator. Furthermore, the release actuator includes a release button mounted on the support arm, and a button spring biases the release button into contact with the second end of the release lever.

In addition, the bracket mounted on the support arm has a mounting hole and the support arm and the bushing each also have a mounting hole. A pin extends through the mounting holes of the bracket, the support arm and the bushing to pivotally mount the bushing of the adjuster housing on the support arm. The bracket has a flange which includes a pivot opening, and the release mechanism includes a pivotal connection of the intermediate portion of the first class release lever.

The objects, features and advantages of the present invention are readily apparent from the following detailed description of the preferred embodiment when taken in connection with the accompanying drawings.

BRIEF DESCRIPTION OF THE DRAWINGS

FIG. 1 is a perspective view of a vehicle armrest which includes a positioning assembly constructed in accordance with the present invention.

FIG. 2 is a longitudinal view taken through the vehicle armrest positioning assembly.

DETAILED DESCRIPTION OF THE PREFERRED EMBODIMENT

With reference to FIG. 1, a vehicle seat armrest generally indicated by 10 includes an armrest positioning assembly 12 constructed in accordance with the present invention to provide support of the armrest on the vehicle seat frame 14 which is partially shown.

As illustrated in FIG. 2, the armrest positioning assembly 12 of the invention includes a support arm 16 which is mounted within the armrest and has a support end 18 for pivotally supporting the armrest about a pivotal axis A on the vehicle seat frame 14 to position the armrest with respect to the seat frame.

Figure 3:
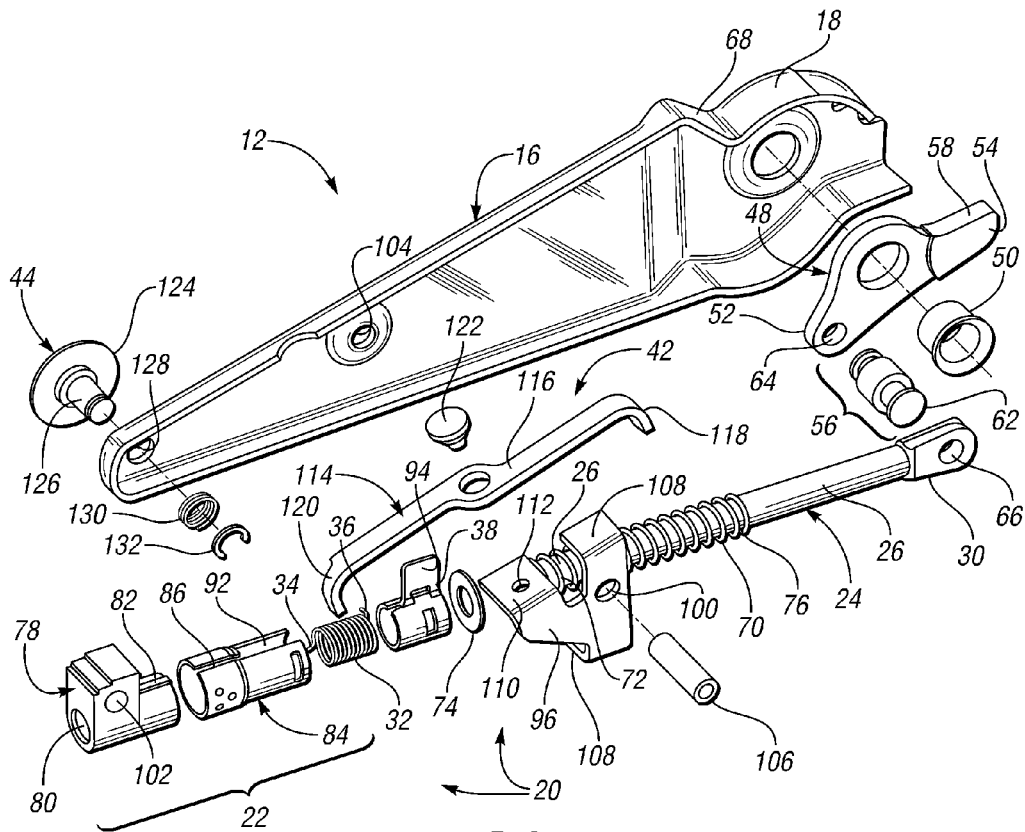
FIG. 3 is an exploded perspective view of the vehicle armrest positioning assembly.

As shown in FIGS. 2 and 3, an elongated adjuster 20 of positioning assembly 12 includes a housing that is collectively indicated by 22 and is mounted on the support arm. An elongated adjusting rod 24 of the adjuster has one end 26 supported by the housing 22 and an intermediate portion 28 extending from the housing as well as having a distal end 30. A helical lock spring 32 best shown in FIG. 3 receives the one end 26 of the adjusting rod 24. This helical lock spring 32 has a first end 34 that is fixed to the housing 22 as is hereinafter more fully described and also has a second end 36 that is movable with respect to the housing about the one end of the adjusting rod as is also hereinafter more fully described. The helical lock spring 32 clamps around the one end 26 of the adjusting rod 24 to position the adjusting rod against movement inwardly or outwardly of the housing. A release member 38 of the adjuster 20 is mounted on the housing 22 for rotation about the one end of the adjusting rod 24 and has a connection 40 to the second end 36 of the lock spring 32.

Figure 4:
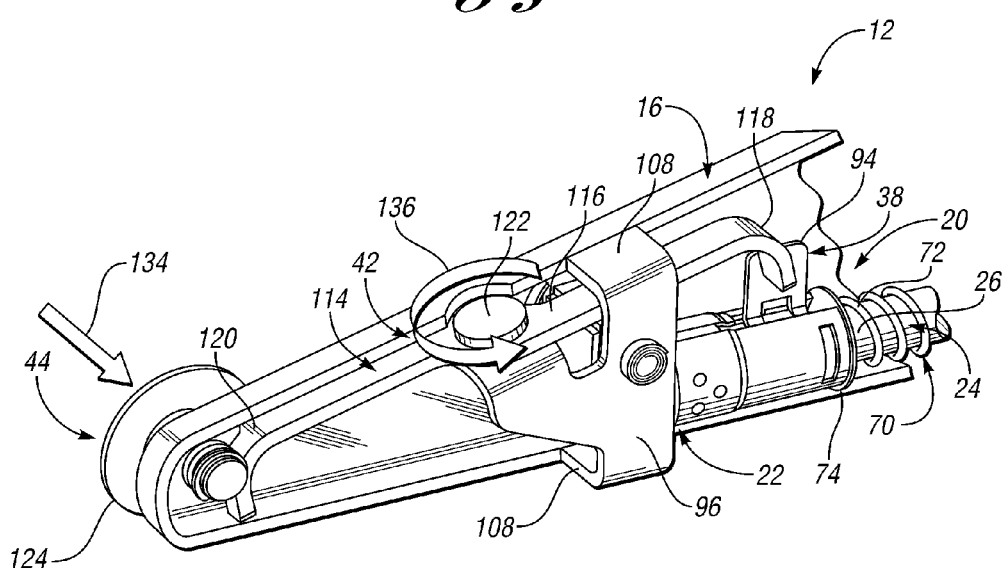
FIG. 4 is a partial view of the vehicle armrest positioning assembly showing the manner in which a release actuator is operated to permit armrest adjustment.

As shown in FIGS. 2-4, a release mechanism 42 of the positioning assembly has a release actuator 44 mounted on the support arm 16 for rotating the release member 38 to move the second end 36 of the lock spring 32 and increase the diameter of the lock spring so the adjusting rod 24 can move inwardly or outwardly of the housing as shown by arrows 46 in FIG. 2 to thereby permit adjustment of the position of the armrest on the seat frame. This adjustment can be from the horizontal both upwardly and downwardly in inclined orientations. Downward inclinations of up to about 15° and upward inclinations of about 25° from the horizontal have been demonstrated as useful in providing seating comfort although any inclination that is helpful for the particular seating application can be used.

As illustrated in FIGS. 2 and 3, the positioning assembly 12 as disclosed includes a control member 48 pivotally supported on the support end 18 of the support arm 16 by a tubular pivot 50 through which a seat frame pivot pin can extend to provide the pivotal support of the support arm and hence the armrest. The control member 48 includes a connection portion 52 and a stop portion 54. A pivotal connection 56 connects the connection portion 52 of the control member 50 to the distal end 30 of the adjusting rod 24, and the stop portion 54 of the control member has a stop surface 58 for contacting a stop 60 on the seat frame 14 to position the armrest in a position whose angle is controlled by the extent to which the adjusting rod 24 extends from the housing 22 of the adjuster 20. More specifically, when the adjusting rod 24 extends outwardly from the adjuster housing 22 a greater extent, the control member 52 is rotated counterclockwise with respect to the positioning arm support end 18 so that the positioning arm is inclined upwardly toward the left with a greater angle. Conversely, when the adjusting rod 24 extends outwardly of the adjuster housing 22 a lesser extent, the control member 52 is positioned more toward a clockwise direction so that the contact of the stop surface with the vehicle seat frame stop 60 positions the positioning arm 16 with a lesser upward inclination or even a downward inclination toward the left.

As best shown in FIG. 3, the pivotal connection 56 includes a pivot pin 62 and the distal end 30 of the adjusting rod 24 and the connection portion 52 of the control member 50 have pivot openings 64 and 66, respectively, that receive the pivot pin 62 to pivotally connect the adjuster rod and the control member.

Figure 5:
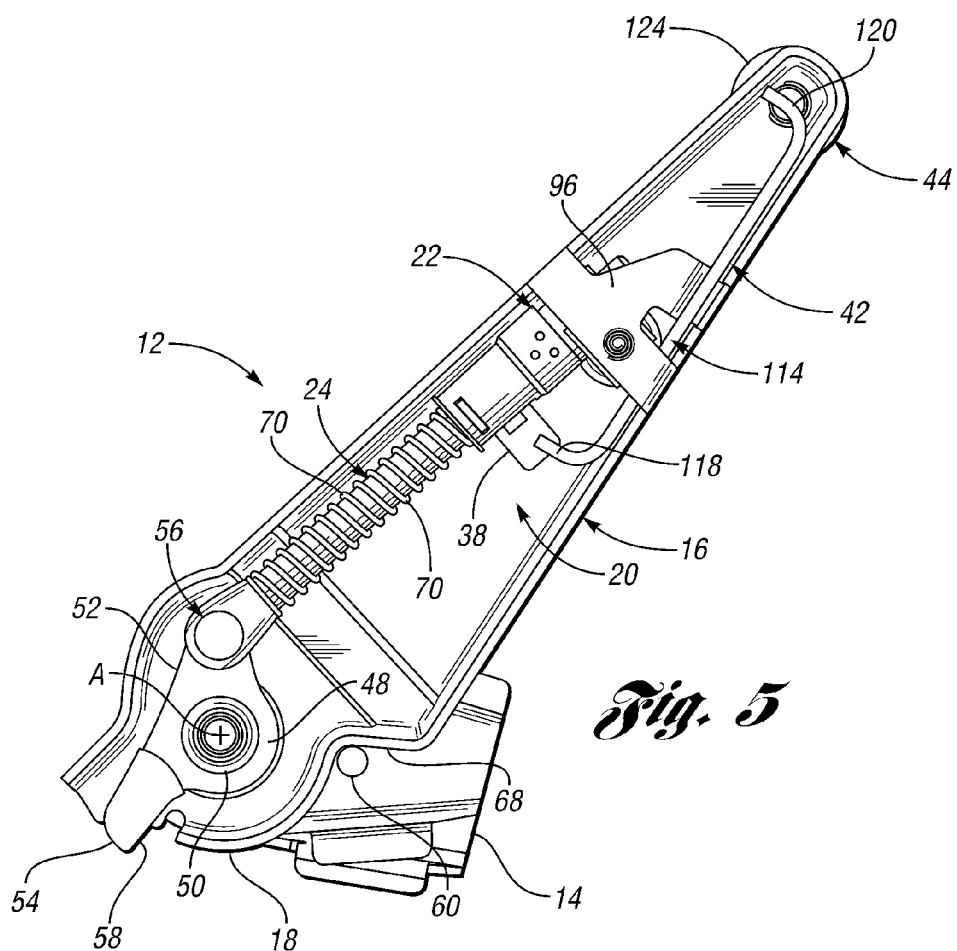
FIG. 5 is a view showing the armrest in a generally vertical but slightly rearwardly inclined nonuse or storage position.

The support arm 12 is movable from the use position of FIG. 2 to a nonuse position as shown in FIG. 5 extending upwardly and with a rearward inclination with respect to the seat and has a stop surface 68 for contacting the stop 60 of the seat frame 14 to position the armrest in this nonuse position. Thus, in the use position, the vehicle seat frame stop 60 is contacted by the stop surface 58 of the control member 52 generally at its lower side while the stop 60 is contacted by the positioning arm stop surface 68 generally at its upper side in the nonuse position of FIG. 5. Of course, the stop can include stop surfaces that are spaced farther from each other or as separate stop portions to provide the two different modes of stop functioning.

As best shown in FIGS. 2 and 3, the adjuster 20 includes a biasing spring 70 that biases the adjusting rod 24 outwardly with respect to its housing 22. This biasing spring 70 is a helical spring through which the adjusting rod 24 extends. The helical biasing spring has one end that contacts the adjuster housing 22 at a washer 74 through which the adjusting rod also extends and has another end 76 that contacts the adjusting rod adjacent its enlarged distal end 30 to provide the biasing of the adjusting rod outwardly with respect to the housing.

As illustrated by the exploded perspective view of FIG. 3, the adjuster housing 22 includes a bushing 78 that is mounted on the support arm in a manner that is hereinafter more fully described and that may be made of powdered metal. This bushing 78 has an opening 80 through which the end 26 of the adjusting rod 24 extends and is slidable. Bushing 78 also has a positioning rib 82 that extends parallel to the opening 80 that receives the adjusting rod 24. A sleeve 84 of the adjuster housing 22 has a generally tubular shape and is mounted by the bushing with the bushing rib 82 received within a sleeve slot 86 to prevent rotation of the sleeve on the bushing.

Figure 6:
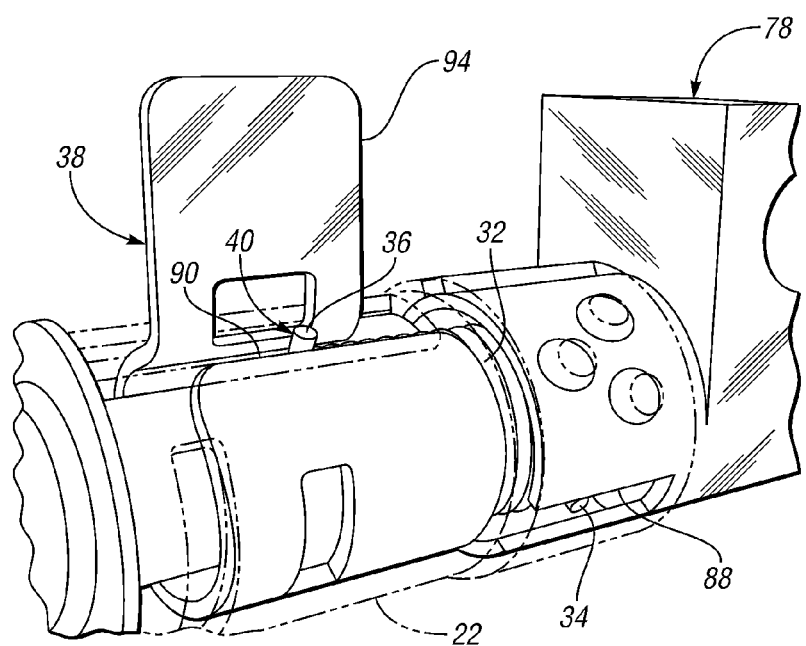
FIG. 6 is a partial view illustrating the manner in which a lock spring is connected to an adjuster housing and a release member for release actuation.

As shown in FIG. 6, the bushing 78 has an axial slot 88 that receives the first end 34 of the lock spring 32 for connection to the adjuster housing at the bushing. The release member 38 is also received within the sleeve 84 and has a sleeve like construction including a slot 90 that receives the second end 36 of the lock spring to provide the connection to the lock spring. The housing sleeve 84 as shown in FIG. 3 has a partial opening 92 through which a release tab 94 of the release member 38 extends outwardly at one end circumferential side of its slot 90 shown in FIG. 6. The bushing opening 80 and the release member 38 have ramp surfaces that contact the lock spring 32 adjacent its opposite ends 34 and 36 at angular orientations so that circumferential movement of the second end 36 of the lock spring by the release member upon rotational movement of its tab 34 increases the diameter of the lock spring to allow the adjusting rod to slide inwardly and outwardly. This movement of the release tab is provided by operation of the actuator 44 of release mechanism 42 as further described below.

With reference to FIGS. 2-4, the positioning assembly 12 also includes a bracket 96 for pivotally mounting the bushing 78 of the adjuster housing on the positioning arm 16. The bracket 96, the bushing 78 and the positioning arm 16 have respective mounting holes 100, 102 and 104 through which a pin 106 extends to mount the bracket on the positioning arm and pivotally support the bushing in the adjacent end of adjuster 20. Mounting pin 100 may be a roll pin having a press fit with the bracket and positioning arm holes 100 and 104 or may be secured by forming its ends or with the use of suitable fasteners and the bushing mounting opening 102 has a spaced fit with the pin so as permit pivoting. Bracket 96 has flanges 108 that contact the positioning arm as best shown in FIG. 4 to provide its mounting in cooperation with the mounting pin 106. In addition, bracket 96 has a mounting arm 110 which, as shown in FIG. 3, has a pivot opening 112 for mounting the release mechanism 42 as is hereinafter more fully described.

With reference to FIGS. 2-4, the release mechanism 42 includes a first class lever 114 having an intermediate portion 116 and first and second ends 118 and 120. A pivotal connection includes a pivot pin 122 that pivotally mounts the intermediate portion 116 of the release lever 114 on the bracket flange 110 which has the pivot opening 112 as shown in FIG. 3. The first end 118 of the release lever 114 contacts the release member 38 at its release tab 94, while the second end 120 of the release lever is contacted by the release actuator 44. Manual operation of the release actuator 44 pivots the release lever 114 and thereby moves the release member 38 about the adjusting rod so that the lock spring 32 shown in FIG. 3 has its diameter increased in order to allow the adjusting member to move inwardly or outwardly with respect to the adjuster housing 22. When the armrest is moved upwardly with the release actuator, the adjusting member moves outwardly of the adjuster housing and, conversely, moves inwardly when the armrest is adjusted downwardly. Also, as previously mentioned, when the armrest is not needed, it is pivoted to the rearwardly inclined position of FIG. 5 with its stop surface 68 contacting the vehicle seat frame stop 60.

As shown in FIG. 3, the release actuator 42 includes a release button 124 having a release projection 126 that extends through a hole 128 in the outer end of the positioning arm 16 and also through a spring 130 for securement by an attachment clip 132. The spring 130 biases the release projection 126 against the end 120 of the release lever 114 so that its one end 118 is maintained in contact with the release tab 94 of the release member 38 but is insufficient to overcome the bias of the lock spring. Manual depression of the release button 124 as shown by arrow 134 in FIG. 4 provides rotation of the release lever 114 as shown by the curved arrow 136 to move the release member and allow the adjusting member movement as described above.

Helical spring locking has previously been used as disclosed by U.S. Pat. No. 3,874,480 Porter et al. and U.S. Pat. No. 5,157,826 Porter et al., the entire disclosures of which are hereby incorporated by reference.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle armrest positioning assembly for supporting an armrest on a vehicle seat frame, comprising:

a pivotal support arm for mounting within an armrest and having a support end for pivotally supporting the armrest about a pivotal axis on the vehicle seat frame to position the armrest with respect to the seat frame;

an elongated adjuster including a housing mounted by the support arm, an elongated adjusting rod having one end supported by the housing and having an intermediate portion extending from the housing as well as having a distal end, the distal end of the adjusting rod cooperating with the seat frame to control the pivotal positioning of the armrest on the seat frame, a helical lock spring mounted within the housing and receiving the one end of the adjusting rod, the helical lock spring having a first end that is fixed to the housing and a second end that is movable with respect to the housing about the one end of the adjusting rod, the helical lock spring clamping about the one end of the adjusting rod to position the adjusting rod against movement inwardly or outwardly of the housing, and a release member mounted by the housing for rotation about the one end of the adjusting rod and having a connection to the second end of the helical lock spring;

the adjuster housing including a bushing mounted on the support arm and having an opening through which the adjusting rod extends and is slidable, a sleeve mounted by the bushing and receiving the helical lock spring through which the adjusting rod extends, the first end of the helical lock spring being connected to the adjuster housing at the bushing, and the sleeve also receiving the release member to which the second end of the helical lock spring is connected;

a bracket mounted on the support arm and having a mounting hole, the support arm and the bushing each also having a mounting hole, a pin extending through the mounting holes of the bracket, the support arm and the bushing to pivotally mount the bushing of the adjuster housing on the support arm, the bracket also having a flange which includes a pivot opening; and a release mechanism mounted on the support arm and having a release actuator for rotating the release member of the adjuster to move the second end of the helical lock spring and increase the diameter thereof so the adjusting rod can move inwardly or outwardly of the housing and thereby adjust the position of the armrest, the release mechanism including a pivotal connection having a pivot pin and also including a first class release lever having an intermediate portion pivotally mounted by the pivot pin on the bracket flange, and the release lever also having a first end that contacts the release member of the adjuster and a second end that is moved by the release actuator to thereby rotate the release member of the adjuster to move the second end of the lock spring and increase the diameter thereof so the adjusting rod can move inwardly or outwardly of the housing and adjust the position of the armrest.

2. A vehicle armrest positioning assembly as in claim 1 which includes a control member pivotally supported on the support end of the support arm and having a connection portion and a stop portion, a pivotal connection that connects the connection portion of the control portion to the distal end of the adjusting rod, and the stop portion having a stop surface for contacting a stop on the seat frame to position the armrest in a position whose angle is controlled by the extent to which the adjusting rod extends from the housing of the adjuster.

3. A vehicle armrest positioning assembly as in claim 2 wherein the pivotal connection includes a pivot pin and the distal end of the adjuster rod and the connection portion of the control member having pivot openings that receive the pivot pin to pivotally connect the adjuster rod and the control member.

4. A vehicle armrest positioning assembly as in claim 2 wherein the support arm includes a stop surface for contacting the stop on the seat frame to position the armrest in a rearwardly inclined nonuse position.

5. A vehicle armrest positioning assembly as in claim 1 wherein the adjuster includes a biasing spring that biases the adjusting rod outwardly with respect to the housing.

6. A vehicle armrest positioning assembly as in claim 5 wherein the biasing spring is a helical spring through which the adjusting rod extends, the helical biasing spring having one end that contacts the adjuster housing and another end that contacts the adjusting rod adjacent its distal end to provide the biasing of the adjusting rod outwardly with respect to the housing.

7. A vehicle armrest positioning assembly as in claim 1 wherein the first and second ends of the release lever have bent shapes that respectively contact the release lever of the adjuster and the release actuator.

8. A vehicle armrest positioning assembly as in claim 1 wherein the release actuator includes a release button mounted on the support arm, and a button spring that biases the release button into contact with the second end of the release lever.

9. A vehicle armrest positioning assembly as in claim 1 which includes a control member pivotally supported on the support end of the support arm and having a connection portion and a stop portion, a pivotal connection that connects the connection portion of the control portion to the distal end of the adjusting rod, the stop portion having a stop surface for contacting a stop on the seat frame to position the armrest in a position whose angle is controlled by the extent to which the adjusting rod extends from the housing of the adjuster, the pivotal connection including a pivot pin, the distal end of the adjuster rod and the connection portion of the control member having pivot openings that receive the pivot pin to pivotally connect the adjuster rod and the control member, the adjuster including a biasing spring that biases the adjusting rod outwardly with respect to the housing, the biasing spring being a helical spring through which the adjusting rod extends, the helical biasing spring having one end that contacts the housing and another end that contacts the adjusting rod adjacent its distal end to provide the biasing of the adjusting rod outwardly with respect to the housing, the housing including a bushing mounted on the support arm and having an opening through which the adjuster rod extends and is slidable, a sleeve mounted by the bushing and receiving the helical lock spring through which the adjuster rod extends, the first end of the helical lock spring being connected to the housing at the bushing, and the sleeve also receiving the release member to which the second end of the helical lock spring is connected.

10. A vehicle armrest positioning assembly for supporting an armrest on a vehicle seat frame, comprising:
  a pivotal support arm for mounting within an armrest and having a support end for pivotally supporting the armrest about a pivotal axis on the vehicle seat frame to position the armrest with respect to the seat frame;
  an elongated adjuster including a housing mounted by the support arm, an elongated adjusting rod having one end supported by the housing and having an intermediate portion extending from the housing as well as having a distal end, the distal end of the adjusting rod cooperating with the seat frame to control the pivotal positioning of the armrest on the seat frame, a helical lock spring mounted within the housing and receiving the one end of the adjusting rod, the helical lock spring having a first end that is fixed to the housing and a second end that is movable with respect to the housing about the one end of the adjusting rod, the helical lock spring clamping about the one end of the adjusting rod to position the adjusting rod against movement inwardly or outwardly of the housing, and a release member mounted by the housing for rotation about the one end of the adjusting rod and having a connection to the second end of the helical lock spring;
  a release mechanism mounted on the support arm and having a release actuator for rotating the release member of the adjuster to move the second end of the lock spring and increase the diameter thereof so the adjusting rod can move inwardly or outwardly of the housing for adjusting movement and thereby adjust the position of the armrest;
  a control member pivotally supported on the support end of the support arm and having a connection portion and a stop portion, a pivotal connection that connects the connection portion of the control portion to the distal end of the adjusting rod, and the stop portion having a stop surface for contacting a stop on the seat frame to position the armrest in a use position whose angle is controlled by the extent to which the adjusting rod extends from the housing of the adjuster; and
  the support arm including a stop surface for contacting the stop on the seat frame to position the support arm in a rearwardly inclined nonuse position, and the support arm being movable between the use and nonuse positions without operation of the release mechanism for the adjusting movement of the adjusting rod.

* * * * *